(12) United States Patent
Golla

(10) Patent No.: US 6,797,892 B2
(45) Date of Patent: Sep. 28, 2004

(54) FORCE TRANSDUCER FOR A MOTOR VEHICLE SEAT THAT INCLUDES A HOUSING SURROUNDING AN EXTENSION MEMBER OF THE FORCE TRANSDUCER

(75) Inventor: Lother Golla, Ahrensburg (DE)

(73) Assignees: GWT Global Weighing Technologies GmbH, Hamburg (DE); Sartorius AG, Göttingen (DE)

( * ) Notice: Subject to any disclaimer, the term of this patent is extended or adjusted under 35 U.S.C. 154(b) by 0 days.

(21) Appl. No.: 10/333,358

(22) PCT Filed: Jul. 20, 2001

(86) PCT No.: PCT/EP01/08437

§ 371 (c)(1),
(2), (4) Date: Jun. 16, 2003

(87) PCT Pub. No.: WO02/08705

PCT Pub. Date: Jan. 31, 2002

(65) Prior Publication Data

US 2004/0007397 A1 Jan. 15, 2004

(30) Foreign Application Priority Data

Jul. 21, 2000 (DE) .......................................... 100 35 483

(51) Int. Cl.[7] ............................ G01L 1/04; B60R 21/01; G01G 19/52
(52) U.S. Cl. ....................... 177/144; 177/229; 180/273; 280/735; 73/862.627; 73/862.637; 73/862.639; 73/768
(58) Field of Search ................................. 177/144, 211, 177/229; 73/862.627, 862.631, 862.632, 862.633, 862.637, 862.639, 768; 180/273; 280/735; 701/45

(56) References Cited

U.S. PATENT DOCUMENTS

| 4,095,660 A | * | 6/1978 | Johansson .................... 177/136 |
|---|---|---|---|
| 4,361,199 A | * | 11/1982 | Ulicny .......................... 177/154 |
| 4,412,456 A | | 11/1983 | Wilhelm et al. ......... 73/862.541 |
| 4,478,091 A | * | 10/1984 | Forrester ................ 73/862.541 |
| 4,516,646 A | * | 5/1985 | Bergfalk ...................... 177/211 |
| 4,694,921 A | * | 9/1987 | Johnston ...................... 177/136 |
| 4,957,177 A | * | 9/1990 | Hamilton et al. ............ 177/211 |
| 5,190,116 A | * | 3/1993 | Reichow ...................... 177/211 |
| 5,823,278 A | * | 10/1998 | Geringer ...................... 177/144 |
| 5,837,946 A | * | 11/1998 | Johnson et al. .............. 177/136 |
| 5,991,676 A | * | 11/1999 | Podoloff et al. ............... 701/45 |
| 6,323,443 B1 | | 11/2001 | Aoki et al. ................. 177/144 |
| 6,412,357 B2 | * | 7/2002 | Billen .................... 73/862.637 |
| 6,583,367 B2 | * | 6/2003 | Wolfe et al. ................. 177/136 |

FOREIGN PATENT DOCUMENTS

| DE | 199 25 877 A | 6/1999 |
|---|---|---|
| GB | 2 150 307 A | 6/1985 |
| GB | 2 333 070 A | 7/1999 |

* cited by examiner

Primary Examiner—Randy W. Gibson
(74) Attorney, Agent, or Firm—Nixon Peabody LLP; David S. Safran

(57) ABSTRACT

A force transducer for sensing the weight introduced into the mounting of a motor vehicle seat is disclosed. The force transducer includes a force introduction element that is connected to the motor vehicle seat, a force transfer element that is connected to the mounting, and an extension member that is arranged between the force introduction element and the force transfer element. The force transducer makes it possible to accurately determine the weight introduced into the mounting of the motor vehicle seat independently of other influencing forces by the fact that the force introduction element or the force transfer element surrounds the extension member in a plane that extends parallel to the effective direction of the weight, and that at least one wire strain gauge for sensing a shearing force parallel to the weight is arranged on the extension member.

19 Claims, 6 Drawing Sheets

Figure 1:
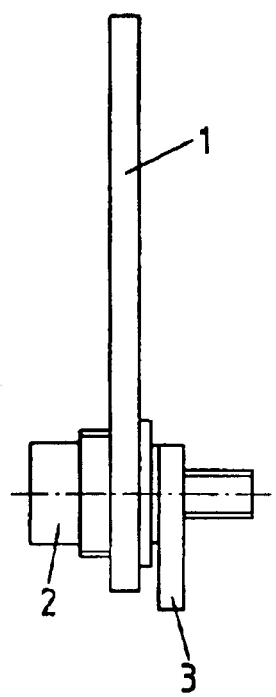

FORCE TRANSDUCER FOR A MOTOR VEHICLE SEAT THAT INCLUDES A HOUSING SURROUNDING AN EXTENSION MEMBER OF THE FORCE TRANSDUCER

The invention pertains to a force transducer for sensing the weight introduced into the mounting of a motor vehicle seat, comprising a force introduction element that is connected to the motor vehicle seat, a force transfer element that is connected to the mounting, and an extension member that is arranged between the force introduction element and the force transfer element.

Force transducers of this type are used for determining whether certain seats of a motor vehicle are occupied or not. This is, for example, required in instances in which an airbag should not be triggered if the corresponding seat is unoccupied. In addition, force transducers are increasingly utilized for determining the weight and consequently the size of the person occupying the seat. In airbags that have a variable filling volume, this information in connection with information on the person to be protected who occupies the corresponding motor vehicle seat is used for adapting the filling volume to the body size of this person so as to optimally restrain the person in case of an accident. Force transducers of this type can also be used for preventing an airbag from being triggered if it is determined that a child safety seat is situated on the passenger seat. This information is particularly desirable because it was determined that infants have suffered severe injuries in child safety seats when an airbag is triggered.

A force transducer for a motor vehicle seat is, for example, known from a DE 199 25 877 A1. The force transducer described in this publication consists of a horizontally arranged force introduction element which is connected to the motor vehicle seat and transmits the introduced force onto both ends of a horizontally arranged plate-shaped extension member. A force transfer element is also provided on the force transducer, wherein said force transfer element is centrally connected to the extension member and transmits the force by the extension member onto the mounting of the motor vehicle seat. Wire strain gauges that are able to sense a vertical bending of the extension member caused by the introduction of a force are arranged on the horizontal upper side of the extension member.

One disadvantage of this force transducer can be seen in the fact that the arrangement of the force introduction element in relation to the extension member also causes forces other than those associated with the weight being introduced into the force introduction element, e.g., lateral forces, to be transmitted onto the extension member and sensed by the wire strain gauges. In this case, the extension member is not only subjected to the weight, but also to the additional forces such that the wire strain gauges sense the combined load. This results in faulty measurements with force transducers of this type due to an asymmetric occupation of the seat, accelerations and decelerations of the motor vehicle and other forces that act upon the mounting of the motor vehicle seat in a direction other than that of the weight. It was also determined that the design of this force transducer influences the rigidity of the connection between the motor vehicle seat and the mounting in such a way that the passenger has the sensation that the motor vehicle seat is guided in the mounting loosely or spongy.

Consequently, the passenger senses movements of the motor vehicle indirectly or in a partially inaccurate fashion. However, this is an annoying sensation for the passengers.

Based on these circumstances, it is an object of the present invention to develop a force transducer for a motor vehicle seat of the initially described type which makes it possible to precisely determine the weight introduced into a mounting of a motor vehicle seat independently of other influencing forces. In addition, this force transducer should have a simple and compact design.

The above-mentioned object is solved with a force transducer of the initially described type by the fact that the force introduction element or the force transfer element surrounds the extension member in a plane that extends parallel to the weight, and that at least one wire strain gauge for sensing a shearing force parallel to the weight is arranged on the extension member.

Since the force introduction element or the force transfer element surrounds the extension member in a plane that extends parallel to the weight, it is possible to fix the extension member therein in such a way that the point at which the force is introduced into the extension member and the point at which the force is transferred by the extension member essentially can only be moved parallel to one another in the direction of the introduced force. If the wire strain gauge that senses the shearing force parallel to the weight is aligned appropriately, the load of the motor vehicle seat can be adequately determined. A slight shearing of the extension member already suffices for carrying out a reliable measurement of the load of the extension member in the direction of the weight. Since only a minimal shearing of the extension member is required for obtaining a reliable measuring result, the extension member can be designed rigidly such that a corresponding rigidity of the entire force transducer and consequently the guidance of the motor vehicle seat in the mounting is achieved. This means that the passenger directly senses any changes in the movement of the motor vehicle.

The arrangement of the force introduction element or the force transfer element in a position in which it surrounds the extension member also provides the advantage that the force transducer can be realized comparatively short. The force introduction element or the force transfer element may be realized in the form of a housing that surrounds the extension member whereby the housing may be connected to one end of the extension member. In this case, the force is introduced into and transferred by the extension member on this end.

If a housing of this type surrounds the extension member in such a way that a thin peripheral gap is formed in at least one location, an overload protection of the force transducer is simultaneously realized with this design. If the force transducer is subjected to such a high load that the housing is moved relative to the end of the extension member that is not connected to the housing to such a degree that the housing partially lies on the extension member, the force between the housing and the extension member is directly introduced into and transferred by the extension member at this location. In this case, an additional extension of the extension member does not occur. The size of the thin gap defines when this overload mode becomes effective, i.e., at which load the extension member is no longer extended.

If the thin peripheral gap is covered by a membrane, the force transducer is protected from dirt particles that may impair the accuracy of the force transducer.

The sensing of a shearing force parallel to the weight provides the advantage that forces which act perpendicular to the weight and, if applicable, are simultaneously introduced into the extension member are not sensed. Due to these measures, it is ensured that the force transducer according to the invention only senses the weight introduced into the mounting of the motor vehicle seat, i.e., independently of other possible loads caused by changes in the moving direction, accelerations or decelerations of the motor vehicle.

The sensing of the weight introduced into the mounting of the motor vehicle seat which is not influenced by lateral forces and achieved by sensing the shearing force parallel to the weight is advantageously achieved due to the fact that two wire strain gauges are respectively arranged oppositely at the same angle referred to the longitudinal axis of the extension member on a surface of the extension member which extends parallel to the effective direction of the weight. In such an arrangement of the wire strain gauges, the deformations of the extension member caused by forces acting laterally referred to the weight are sensed by two wire strain gauges in such a way that they can be simply eliminated in the subsequent evaluation of the measuring signals by forming the difference between said measuring signals.

Alternatively, it would be conceivable to respectively provide two oppositely arranged wire strain gauges that have the same angle referred to the longitudinal axis of the extension member and extend parallel to the effective direction of the weight on opposite surfaces of the extension member. These four wire strain gauges can be advantageously connected in the type of a Wheatstone bridge circuit in order to obtain an optimal measuring signal. If the requirements with respect to the quality of the measuring signal are not very high, it is also possible to replace three of the four wire strain gauges with fixed resistors in such a bridge circuit.

In order to obtain a particularly intense measuring signal, it is practical that the extension member has a reduced cross section at the location at which the wire strain gauge is arranged.

A reduction in the cross section so as to obtain a higher sensitivity, i.e., a more intense signal, can be easily achieved by providing the extension member with a first recess in the region of the wire strain gauges, wherein the axis of the first recess essentially extends parallel to the effective direction of the weight. Due to the arrangement of such a recess in the region of the wire strain gauges, the extension member is deformed more intensely in this region such that a higher sensitivity is achieved.

In the force transducer according to the invention, the lead-throughs for the electric lines required for connecting the wire strain gauges into the interior of the force transducer are advantageously realized by providing the extension member with a second recess, wherein the axis of the second recess essentially extends in the longitudinal direction of the extension member perpendicular to the axis of the first recess, and wherein the second recess penetrates the first recess within the extension member.

This makes it possible to install the electric lines through the extension member up to the wire strain gauges.

If the extension member has an at least partially angular cross section, it is ensured that the wire strain gauge to be positioned on the surface of the extension member can be arranged on a plane surface.

The arrangement of the wire strain gauges on the extension member can be additionally simplified if the extension member has a plane surface that protrudes over the other contours in order to attach the wire strain gauges. This variation allows a particularly simple application of the wire strain gauges by means of the thin-layer technique.

Figure 2:
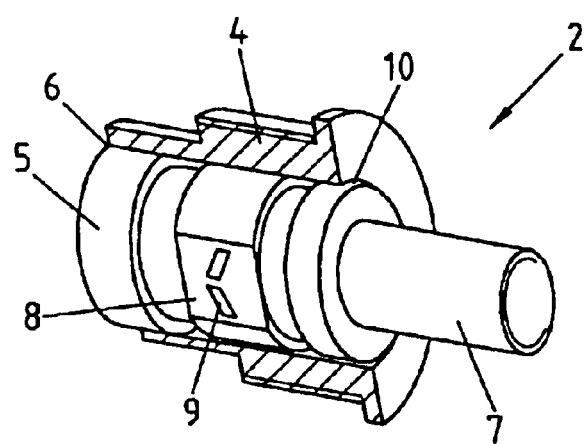
Figure 1A:
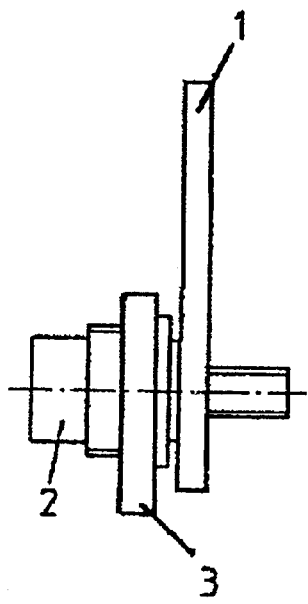
Figure 3:
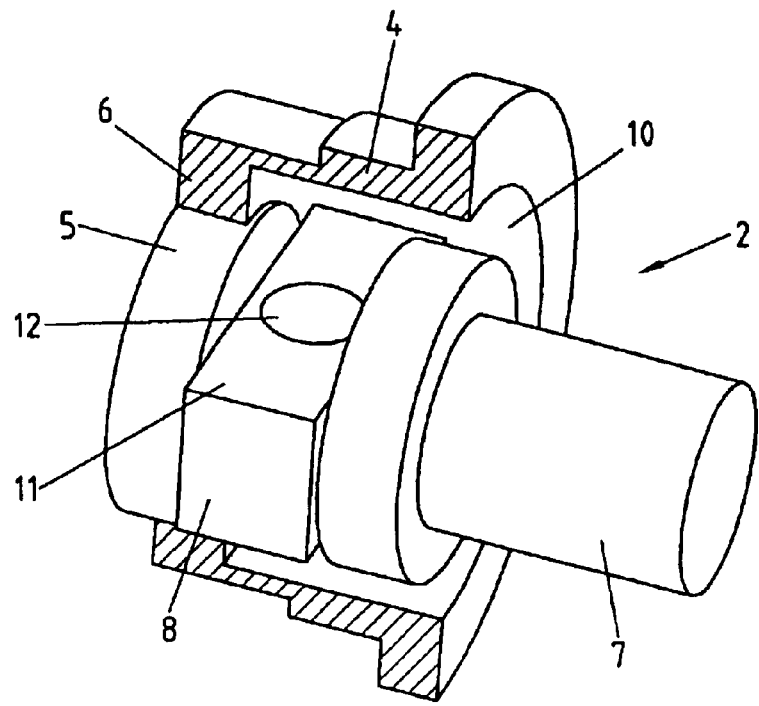
Figure 4:
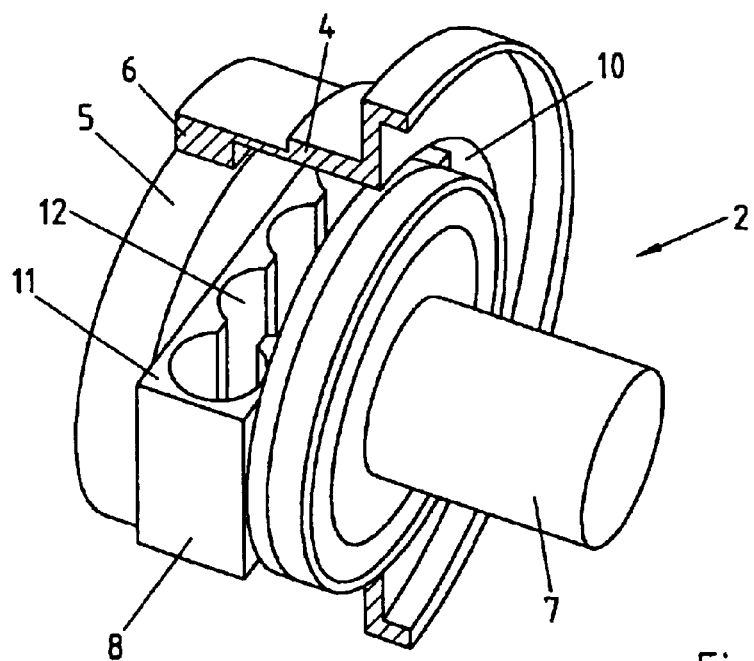
Figure 6:
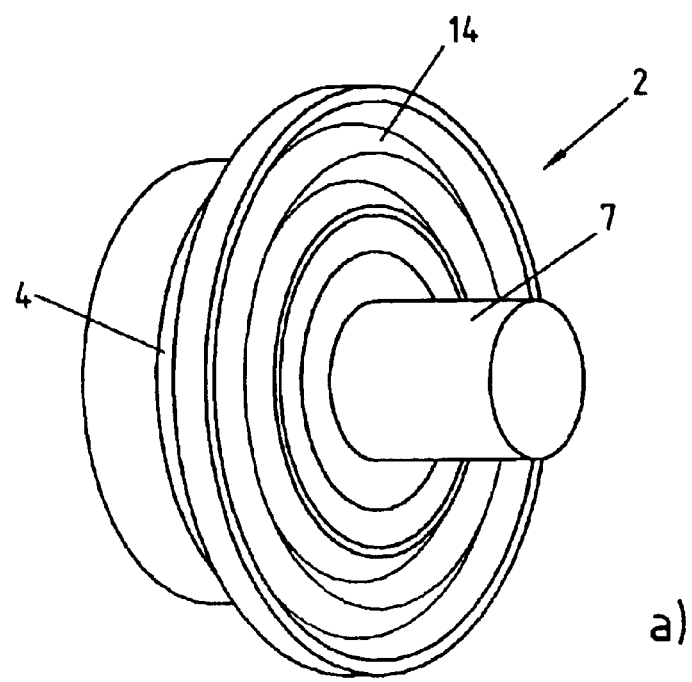
Figure 6:
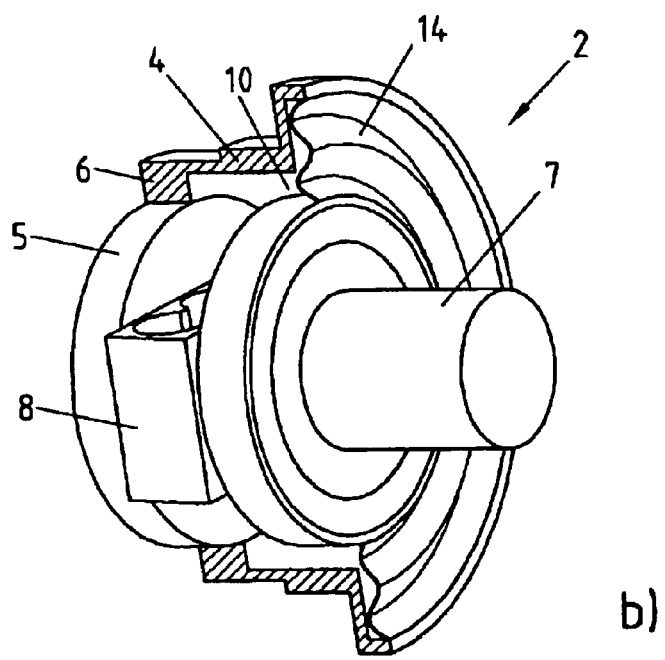
Figure 7:
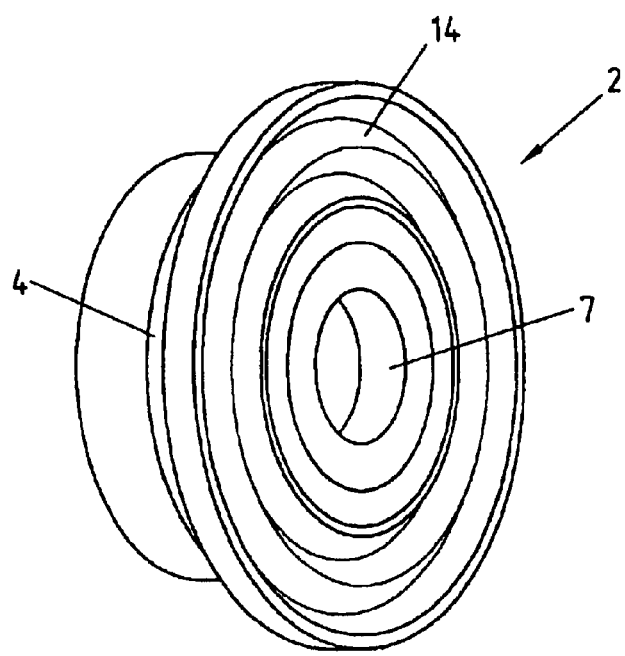

Various options may be considered for realizing and further developing the force transducer according to the invention. In this respect, reference is made to the following description of exemplary embodiments in connection with the figures. The figures show:

FIG. 1, a view of the force transducer of the present invention connected to a motor vehicle seat;

FIG. 1A, a view of the force transducer of the present invention connected to a motor vehicle seat in accordance with another embodiment of the present invention;

FIG. 2, a partially sectioned perspective view of a first embodiment of a force transducer according to the invention;

FIG. 3, a partially sectioned perspective view of a second embodiment of a force transducer according to the invention;

FIG. 4, a partially sectioned perspective view of a third embodiment of a force transducer according to the invention;

FIGS. 5a), b), a section through and a perspective view of a fourth embodiment of a force transducer according to the invention;

FIGS. 6a), b), a perspective view and a partially sectioned perspective view of a fifth embodiment of a force transducer according to the invention, and FIG. 7, a perspective view of a sixth embodiment of a force transducer according to the invention.

FIG. 1 shows two of four mounting webs 1 of a motor vehicle seat F. The mounting webs 1 are connected to the frame of the motor vehicle seat F with their upper ends and to one respective force transducer 2 with their lower ends. The force transducers 2 are also connected to the mounting frame 3 that engages into the guide rail of the motor vehicle seat F.

FIG. 2 shows the design of a first embodiment of the force transducer 2 according to the invention. This force transducer comprises a force introduction element 4 that is realized in the form of a cylindrical housing and connected to the not-shown mounting web 1 by means of an outside thread. The force transducer 2 also comprises an extension member 5 that is centrally arranged in the force introduction element 4 and welded to the force introduction element 4 with one end 6. On the end that is situated opposite of the end 6, the extension member 5 is connected to a force transfer element 7 in the form of a threaded bolt that, if applicable, may be realized integrally with the extension member, wherein the force transfer element is rigidly connected to the mounting frame 3. The cylindrical extension member 5 has a surface 8 that extends parallel to the effective direction of the weight and onto which wire strain gauges 9 are bonded or applied by means of the thin-layer technique, wherein the wire strain gauges are respectively arranged oppositely at an angle of 45° referred to the longitudinal axis of the extension member.

A similar surface that is also provided with two wire strain gauges may be arranged on the opposite side of the extension member 5 referred to the longitudinal axis of the extension member 5. The four wire strain gauges provided in such an embodiment may be connected in the form of a Wheatstone bridge circuit so as to improve the quality of the measuring signal.

A thin gap 10 is arranged on the end that is situated opposite of the end 6, namely between a thickening of the extension member 5 and the force introduction element 4.

When the not-shown motor vehicle seat is subjected to a load, a weight is introduced into the mounting webs 1 and transmitted onto the force introduction element 4 by these mounting webs 1. Due to the rigid connection with the extension member 5, this force is introduced into the extension member 5 at the end 6 of the force introduction element 4 in such a way that the extension member is displaced relative to its end that is rigidly held in the mounting frame 3 by the force transfer element 7, namely parallel to the effective direction of the weight. This causes a defined shearing to occur in the extension member 5 which can be sensed by the wire strain gauges 9.

Although other forces that act orthogonally referred to the weight are also introduced into the mounting webs 1 and consequently into the force introduction element 4, these forces lead to a shearing of the extension member 5 in a direction that extends perpendicular to the plane of the wire strain gauges 5. The wire strain gauges 9 sense this shearing such that it can be eliminated from the measuring result by forming the difference between the measuring signals of the individual wire strain gauges 9.

The gap 10 ensures an effective overload protection of the force transducer 2. If the end 6 of the extension member is subjected to such a high load that the rigid force introduction element 4 and the extension member 5 subjected to the load are moved relative to one another in such a way that the force introduction element 4 is seated on the extension member 5 with its end that is situated opposite to the end 6, the extension member 5 cannot be subjected to any additional shearing force because this force is directly transmitted from the force introduction element 4 to the force transfer element 7 by the covered end of the extension member 5.

With respect to the function of the force transducer 2, it is inconsequential whether the force introduction element 4 forms the housing of the extension member and the force transfer element forms the bolt that is connected to the mounting frame 3 as described above, or the force is introduced via the pin and transmitted onto the mounting frame 3 by the housing, as shown in FIG. 1A, in which case the housing forms the force transfer element.

In the embodiment shown in FIG. 3, the region of the extension member 5 which is realized in the form of a measuring element 11 comprises a first recess 12 that allows the measuring element 11 to be deformed more intensely and thus leads to a higher sensitivity of the not-shown wire strain gauges arranged on the surface 8.

The second embodiment of the force transducer 2 according to the invention which is shown in FIG. 3 also comprises an extension member 5 with a plane surface 8 that protrudes over the other contours and serves for attaching the wire strain gauges that are not shown in FIG. 3. Due to the fact that the surface 8 according to the second embodiment protrudes over the other contours of the extension member 5, it is possible to easily apply the wire strain gauges on the surface 8 by means of the thin-layer technique.

In the third embodiment shown in FIG. 4, the recess 12 is realized in the form of an oblong hole such that an additional increase in the sensitivity is achieved. In this case, the remaining material cross section is reduced without excessively influencing the stability in the lateral direction.

Figure 5:
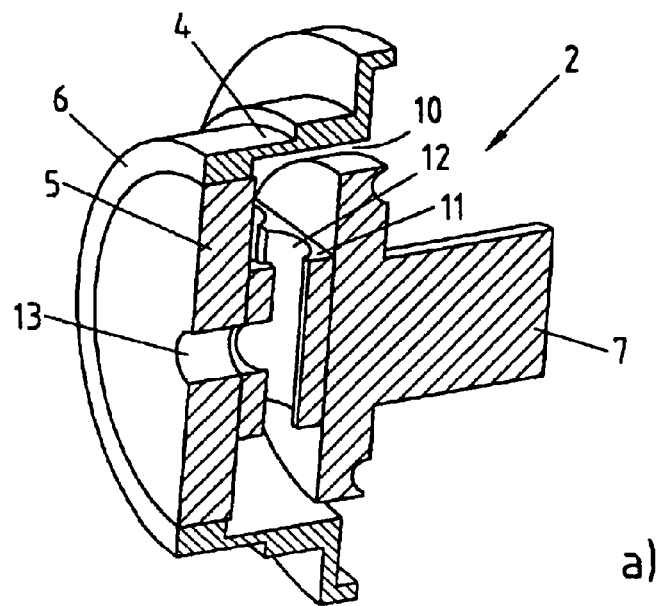
Figure 5:
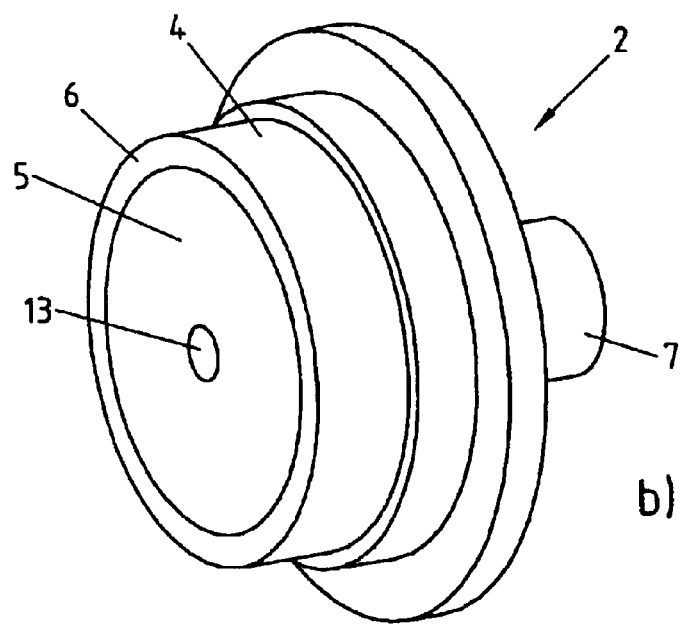

The fourth embodiment shown in FIG. 5 contains a second recess 13, the axis of which extends essentially in the longitudinal direction of the extension member 5 perpendicular to the axis of the first recess 12, wherein the second recess penetrates the first recess 11 within the extension member. This second recess 13 makes it possible to easily install the electric lines required for connecting the wire strain gauges that are not shown in FIG. 5.

In the fifth embodiment of a force transducer 2 according to the invention which is shown in FIG. 6, the annular gap 10 indicated in FIG. 6b) is covered with a membrane 14 in order to prevent the admission of dirt particles into the force transducer 2. A particularly effective protection of the force transducer 2 is achieved if the membrane 14 is realized in the form of a metallic membrane. In this case, the metallic membrane 14 is welded between the force introduction element 4 and the force transfer element 7.

As an alternative to the embodiments shown in FIGS. 2–6, the sixth embodiment of the force transducer 2 according to the invention which is shown in FIG. 7 comprises an inside thread instead of a threaded bolt as the force transfer element 7.

What is claimed is:

1. A force transducer for sensing a weight introduced into a mounting of a motor vehicle seat, comprising:

a force introduction element that is connected to one of the motor vehicle seat and the mounting of the motor vehicle seat, a force transfer element that is connected to the other of the mounting of the motor vehicle seat, and the motor vehicle seat, and an extension member that is arranged between the force introduction element and, the force transfer element, characterized in that the force introduction element or the force transfer element surrounds the extension member in a plane dint extends parallel to the effective direction of the weight.

2. A force transducer according to claim 1, characterized in that at least one wire strain gauge for sensing a shearing force parallel to the weight is arranged on the extension member.

3. The force transducer according to claim 1, characterized in that the force introduction element or the force transfer element is realized in the form of a housing that surrounds the extension member whereby the housing is connected to one end of the extension member with one end.

4. The force transducer according to claim 3, characterized in that the housing surrounds the extension member such that a thin peripheral gap is formed in at least one location.

5. The force transducer according to claim 4, characterized in that the thin peripheral gap is covered by a membrane.

6. The force transducer according to claim 2, characterized in that two wire strain gauges are respectively, arranged oppositely at the same angle referred to the longitudinal axis of the extension member on a surface of the extension member which extends parallel to the effective direction of the weight.

7. The force transducer according to claim 2, characterized in that the extension member has a reduced cross section at the location at which the wire strain gauge is arranged.

8. The force transducer according to claim 7, characterized in that the extension member contains a first recess in the region of the wire strain gauges, and that the axis of the first recess essentially extends parallel to the effective direction of the weight.

9. The force transducer according to claim 8, characterized in that the extension member contains a second recess, the axis of which essentially extends in the longitudinal direction of the extension member perpendicular to the axis of the first, recess, and by the fact that the second recess penetrates the first recess within the extension member.

10. The force transducer according to claim 2, characterized in that the extension member has an at least partially angular cross section.

11. The force transducer according to claim 2, characterized in that the extension member has a protruding plane surface for attaching the wire strain gauges.

12. The force transducer according to claim 3, characterized in that the extension member has a protruding plane surface for attaching the wire strain gauges.

13. The force transducer according to claim 4, characterized in that the extension member has a protruding plane for attaching the wire strain gauges.

14. The force transducer according to claim 5, characterized in that the extension member has a protruding plane surface for attaching the wire strain gauges.

15. The force transducer according to claim 6, characterized in that the extension member has a protruding plane surface for attaching the wire strain gauges.

16. The force transducer according to claim 7, characterized in that the extension member has a protruding plane surface for attaching the wire strain gauges.

17. The force transducer according to claim 8, characterized in that the extension member has a protruding plane surface for attaching the wire swain gauges.

18. The force transducer according to claim 9, characterized in that the extension member has a protruding plane surface for attaching the wire strain gauges.

19. The force transducer according to claim 10, characterized in that the extension member has a protruding plane surface for attaching the wire strain gauges.

* * * * *